(12) United States Patent
Ortelt et al.

(10) Patent No.: US 11,555,471 B2
(45) Date of Patent: Jan. 17, 2023

(54) THRUST CHAMBER DEVICE AND METHOD FOR OPERATING A THRUST CHAMBER DEVICE

(71) Applicant: Deutsches Zentrum fuer Luft- und Raumfahrt e.V., Cologne (DE)

(72) Inventors: Markus Ortelt, Flein (DE); Hermann Hald, Weissach (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 112 days.

(21) Appl. No.: 16/567,049

(22) Filed: Sep. 11, 2019

(65) Prior Publication Data
US 2020/0095956 A1 Mar. 26, 2020

Related U.S. Application Data

(63) Continuation of application No. PCT/EP2018/056517, filed on Mar. 15, 2018.

(30) Foreign Application Priority Data

Mar. 15, 2017 (DE) ..................... 10 2017 105 581.9
Mar. 29, 2017 (DE) ..................... 10 2017 106 758.2

(51) Int. Cl.
*F02K 9/62* (2006.01)
*F02K 9/64* (2006.01)
(Continued)

(52) U.S. Cl.
CPC .................. *F02K 9/62* (2013.01); *F02K 9/42* (2013.01); *F02K 9/44* (2013.01); *F02K 9/64* (2013.01);
(Continued)

(58) Field of Classification Search
CPC ..... F02K 9/44; F02K 9/62; F02K 9/64; F23R 3/18; F23R 3/20; F23R 3/34; F23R 3/346; F23R 3/46; F23R 3/52
See application file for complete search history.

(56) References Cited

U.S. PATENT DOCUMENTS 2,544,419 A * 3/1951 Goddard ................... F02K 9/62
60/260
2,555,081 A * 5/1951 Goddard ................... F02K 9/66
60/201

(Continued)

FOREIGN PATENT DOCUMENTS

CN 87106913 7/1988
CN 103670797 12/2015
(Continued)

*Primary Examiner* — Todd E Manahan
*Assistant Examiner* — Kyle Robert Thomas
(74) *Attorney, Agent, or Firm* — Lipsitz & McAllister, LLC

(57) ABSTRACT

The invention relates to a thrust chamber device comprising a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion, the first portion being delimited by an inner nozzle wall with an inner thrust space surface, which tapers toward the second portion, an annular combustion chamber being formed between the inner thrust space surface and the outer thrust space surface and extending over the first portion.

20 Claims, 8 Drawing Sheets

Figure 1:
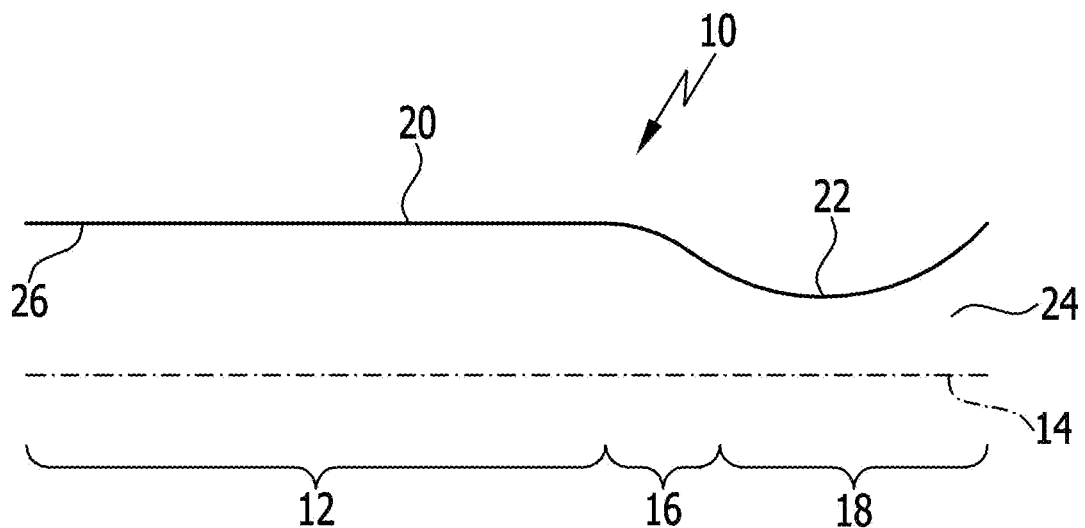

(51) Int. Cl.
  *F02K 9/42* (2006.01)
  *F02K 9/44* (2006.01)
  *F23R 3/00* (2006.01)
  *F23R 3/34* (2006.01)
  *F23R 3/18* (2006.01)
  *F23R 3/20* (2006.01)
(52) U.S. Cl.
  CPC ............... *F23R 3/002* (2013.01); *F23R 3/18* (2013.01); *F23R 3/20* (2013.01); *F23R 3/346* (2013.01)

(56) References Cited

U.S. PATENT DOCUMENTS

| | | | |
|---|---|---|---|
| 2,667,740 A | | 2/1954 | Goddard |
| 3,451,223 A | | 6/1969 | Main |
| 3,626,698 A | | 12/1971 | Baum |
| 3,943,706 A | * | 3/1976 | Grafwallner ............... F02K 9/48 60/204 |
| 4,073,138 A | | 2/1978 | Beichel |
| 4,835,959 A | | 6/1989 | Coffinberry |
| 4,840,025 A | | 6/1989 | Coffinberry |
| 4,841,723 A | * | 6/1989 | Lau ............................ F02K 9/64 60/204 |
| 4,926,632 A | * | 5/1990 | Smith ..................... B64G 1/406 219/121.51 |
| 6,151,887 A | * | 11/2000 | Haidn ....................... F02K 9/64 60/257 |
| 6,279,812 B1 | | 8/2001 | Hallqvist |
| 6,915,627 B2 | * | 7/2005 | Calabro .................... F02K 9/52 60/251 |
| 2004/0128980 A1 | * | 7/2004 | Calabro .................... F02K 9/64 60/257 |
| 2011/0000981 A1 | | 1/2011 | Suslov et al. |
| 2015/0267615 A1 | | 9/2015 | McCulley |

FOREIGN PATENT DOCUMENTS

| | | |
|---|---|---|
| DE | 3734099 | 4/1988 |
| DE | 3734100 | 4/1988 |
| DE | 102005036137 | 2/2007 |
| DE | 60306435 | 6/2007 |
| DE | 102011000383 | 8/2012 |
| DE | 102013105342 | 11/2014 |
| DE | 102013105345 | 11/2014 |
| EP | 1748253 | 1/2007 |
| FR | 2987081 | 8/2013 |
| WO | 2007147522 | 12/2007 |

* cited by examiner

THRUST CHAMBER DEVICE AND METHOD FOR OPERATING A THRUST CHAMBER DEVICE

CROSS-REFERENCE TO RELATED APPLICATIONS

This application is a continuation of international application number PCT/EP2018/056517 filed on Mar. 15, 2018 and claims the benefit of German application number 10 2017 105 581.9 filed on Mar. 15, 2017 and of German application number 10 2017 106 758.2 filed on Mar. 29, 2017, which are incorporated herein by reference in their entirety and for all purposes.

FIELD OF THE INVENTION

The present invention relates to thrust chamber devices in general, and more specifically to a thrust chamber device comprising a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion, the first portion being delimited by an inner nozzle wall having an inner thrust space surface, which tapers toward the second portion, an annular combustion chamber being formed between the inner thrust space surface and the outer thrust space surface and extending over the first portion, the thrust chamber device also comprising a plurality of first propellant inlets for a first propellant component and a plurality of second propellant inlets for a second propellant component.

The present invention also relates to a method for operating a thrust chamber device.

The invention furthermore relates to an engine, in particular for a flying object or an aircraft.

In addition, the present invention relates to flying objects and aircrafts in general, and more specifically to a flying object or an aircraft comprising a first propellant store for at least one first propellant component, a second propellant store for at least one second propellant component, and an engine.

BACKGROUND OF THE INVENTION

Thrust chamber devices of the kind described in the introduction are used for example in engines in order to generate a thrust, for example in order to drive a flying object such as a rocket, in particular by combustion of propellant components. A propellant component may be a fuel, in particular. For example, liquid hydrogen ($LH_2$) may be used as fuel, and liquid oxygen (LOX), which takes on the role of the oxidiser, may be used as further propellant component.

A problem in current high-power rocket drives is constituted in particular by the high pressure losses that occur by the cooling of the outer nozzle wall. In this regard, regenerative cooling systems, film cooling systems and transpiration cooling systems are known in particular.

Film cooling may be used in particular for thermal protection inside the thrust space, either wholly or also only in addition to regenerative wall cooling of conventional thrust chambers, which are made of metallic materials. However, this form of cooling leads to losses of the usable enthalpy of combustion, which in turn reduce the engine efficiency.

With a transpiration-cooled outer nozzle wall, a similar level of efficiency as compared to that achieved with high-power gas generator engines can be reached, however such a transpiration cooling, similarly to film cooling, leads to excessive mass flows of unburned propellant. Furthermore, due to the nature of the system, transpiration cooling is not suitable for the expander cycle, in which turbines for conveying propellant are driven by a propellant component heated in the cooling system of the engine.

In order to increase the efficiency of a thrust chamber with transpiration cooling, only a system in which a small portion of hot gas is branched off from the thrust chamber in order to drive turbines of the turbopumps used for conveying propellant in what is known as the "tap-off cycle" therefore would be used, if at all.

Thus, a problem in all described methods is either a significant pressure loss or an excessive loss of enthalpy of combustion with unreacted propellant.

SUMMARY OF THE INVENTION

According to a first aspect of the invention a thrust chamber device is proposed, comprising a thrust chamber with a thrust space having a first portion, a second portion adjacent thereto, and a third portion adjacent to the second portion. The thrust space is delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion. The first portion is delimited by an inner nozzle wall with an inner thrust space surface, which tapers toward the second portion. An annular combustion chamber is formed between the inner thrust space surface and the outer thrust space surface and extends over the first portion. The thrust chamber device also comprises a plurality of first propellant inlets for a first propellant component and a plurality of second propellant inlets for a second propellant component, wherein the outer nozzle wall comprises at least a part of the plurality of first propellant inlets.

According to a second aspect of the invention an engine is proposed, in particular for a flying object or an aircraft, comprising a thrust chamber device, which comprises a thrust chamber with a thrust space having a first portion, a second portion adjacent thereto, and a third portion adjacent to the second portion. The thrust space is delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion. The first portion is delimited by an inner nozzle wall with an inner thrust space surface, which tapers toward the second portion. An annular combustion chamber is formed between the inner thrust space surface and the outer thrust space surface and extends over the first portion. The thrust chamber device also comprises a plurality of first propellant inlets for a first propellant component and a plurality of second propellant inlets for a second propellant component, wherein the outer nozzle wall comprises at least a part of the plurality of first propellant inlets.

According to a third aspect of the invention a flying object or aircraft is proposed, comprising a first propellant store for at least one first propellant component, a second propellant store for at least one second propellant component, and an engine comprising a thrust chamber device, which comprises a thrust chamber with a thrust space having a first portion, a second portion adjacent thereto, and a third portion adjacent to the second portion. The thrust space is delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion. The first portion is delimited by an inner nozzle wall with an inner thrust space surface, which tapers toward the second portion. An annular combustion chamber is formed between the inner thrust space surface and the outer thrust space surface and extends over the first portion. The thrust chamber device also comprises a plurality of first propellant inlets for a first propellant component and a plurality of second propellant inlets for a second propellant component, wherein the outer nozzle wall comprises at least a part of the plurality of first propellant inlets.

According to a fourth aspect of the invention a method for operating a thrust chamber device is proposed, which comprises a thrust chamber with a thrust space having a first portion, a second portion adjacent thereto, and a third portion adjacent to the second portion. The thrust space is delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion. The first portion is delimited by an inner nozzle wall with an inner thrust space surface, which tapers toward the second portion. An annular combustion chamber is formed between the inner thrust space surface and the outer thrust space surface, which extends over the first portion, wherein the thrust chamber device also comprises a plurality of first propellant inlets for a first propellant component and a plurality of second propellant inlets for a second propellant component. The outer nozzle wall comprises at least a part of the plurality of first propellant inlets, wherein a greater amount of the first propellant component than is necessary for cooling the inner nozzle wall and/or the outer nozzle wall is injected into the thrust space through a part of the plurality of first propellant inlets.

BRIEF DESCRIPTION OF THE DRAWING FIGURES

Figure 2:
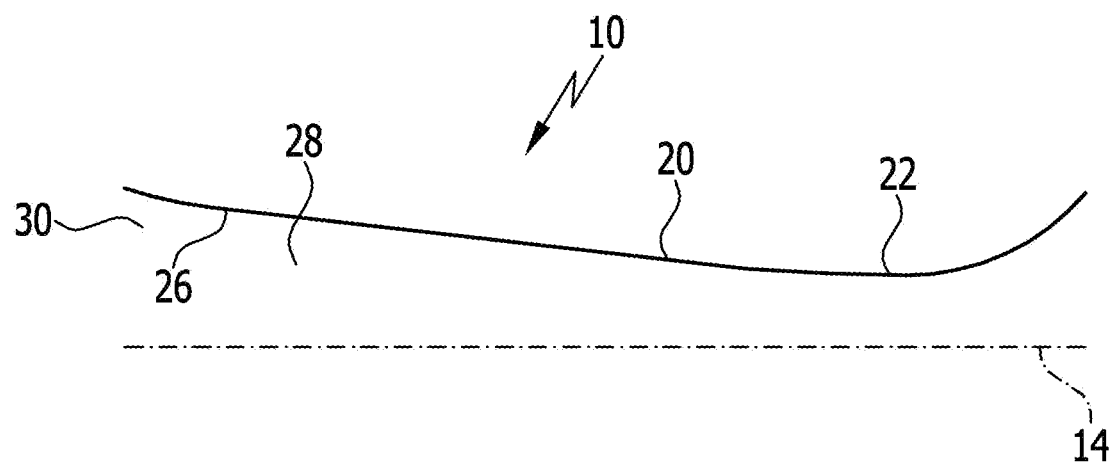
Figure 3:
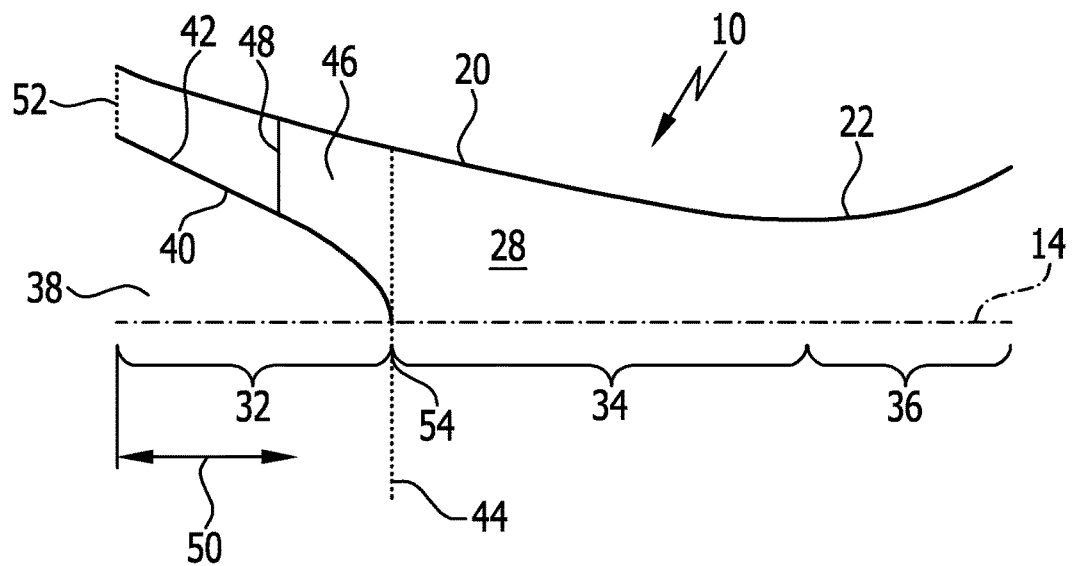
Figure 4:
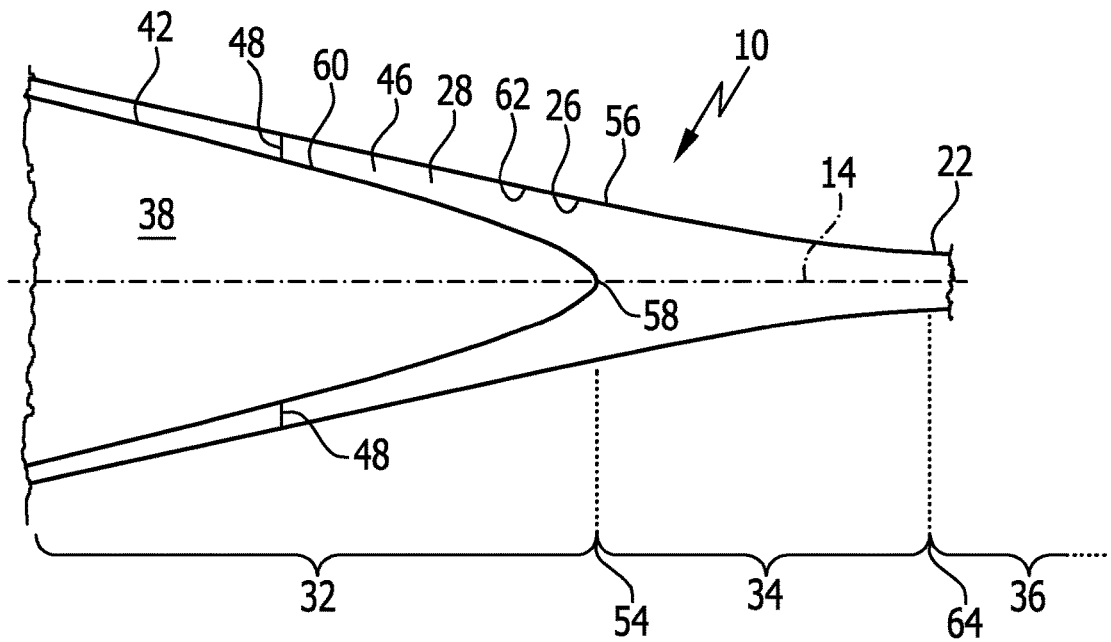
Figure 5:
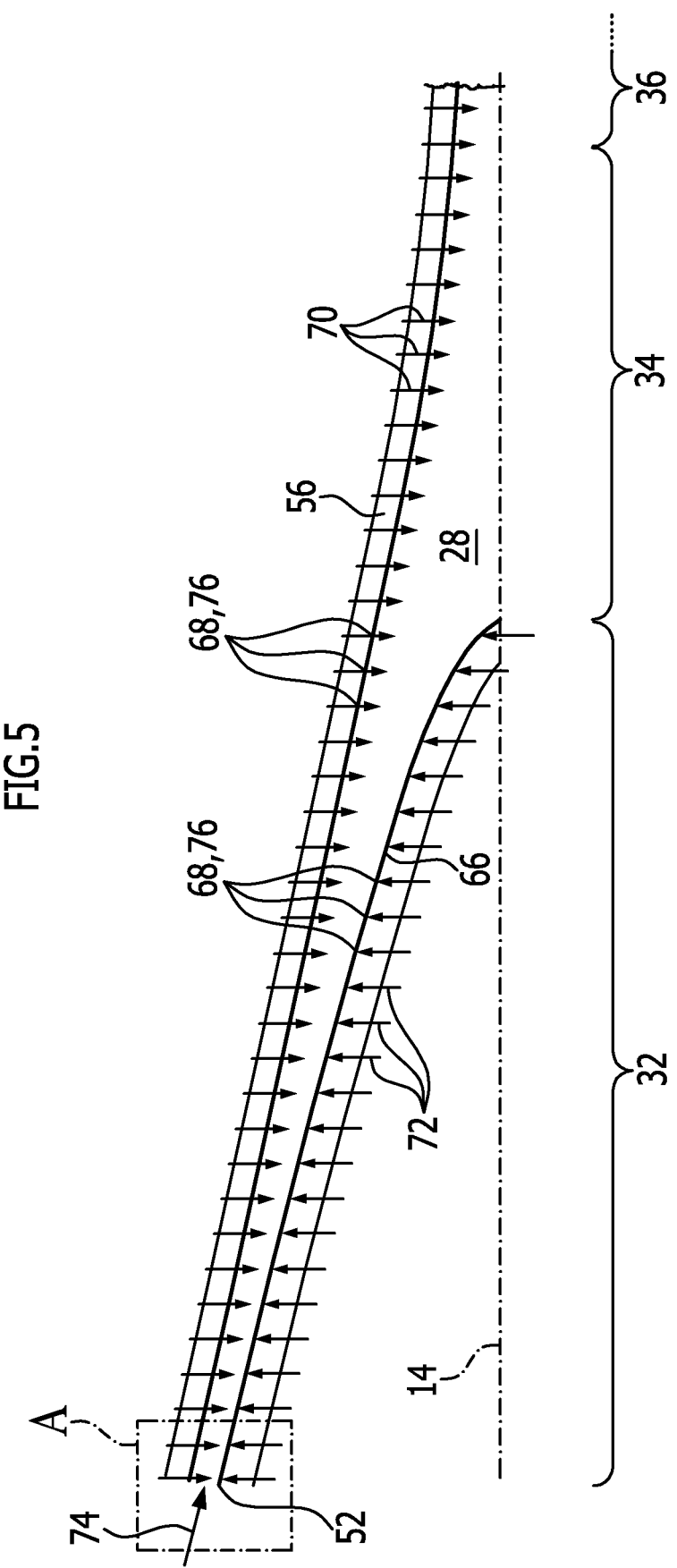
Figure 6:
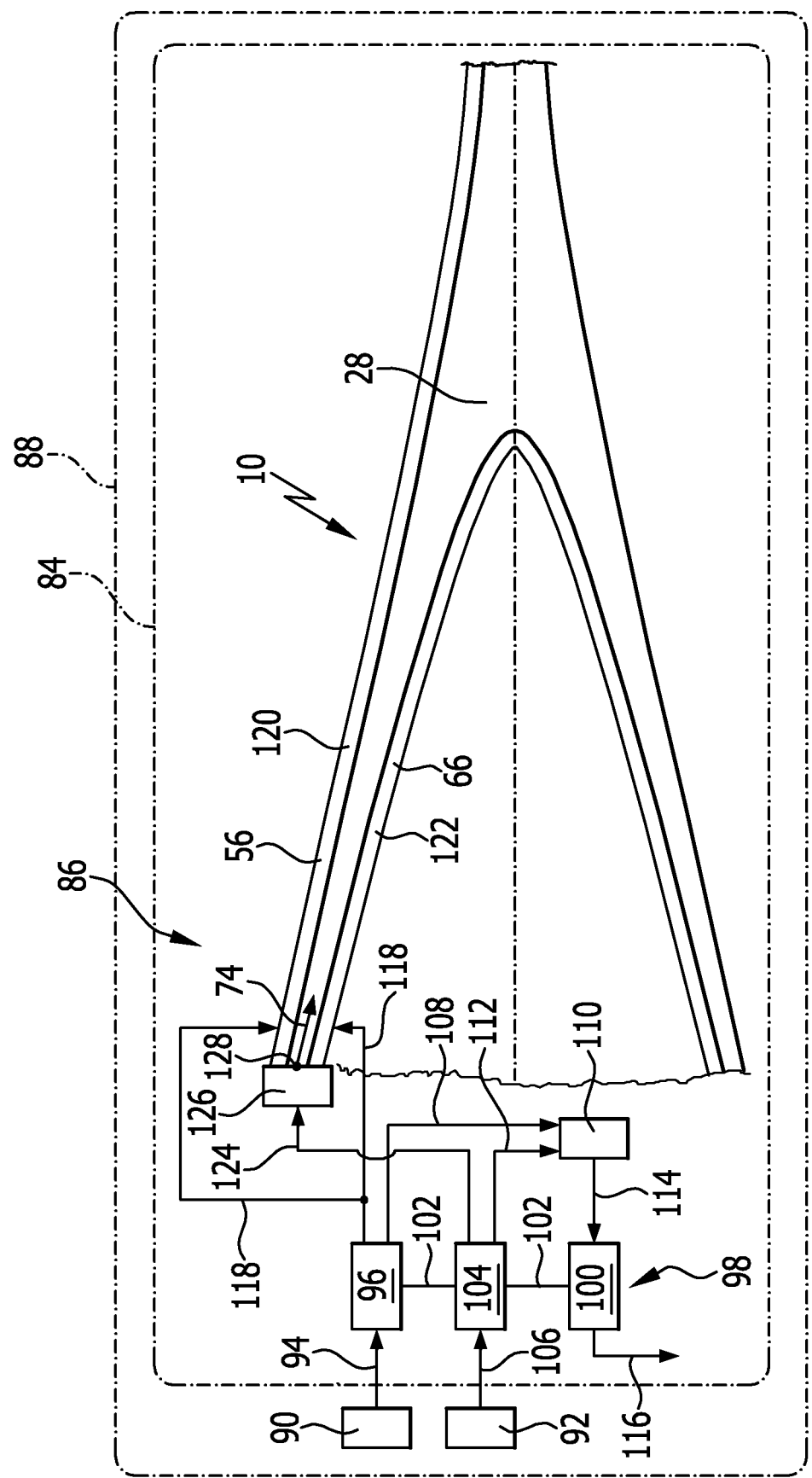
Figure 7:
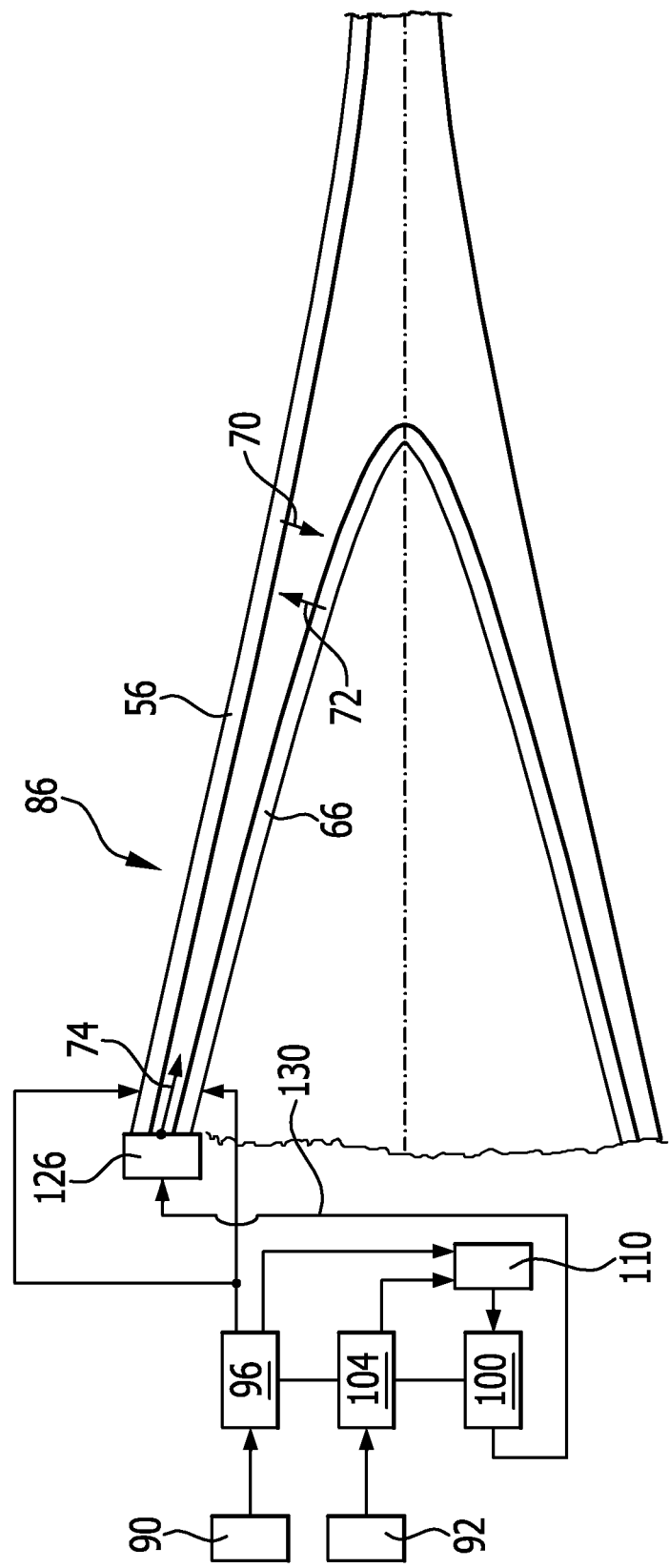
Figure 8:
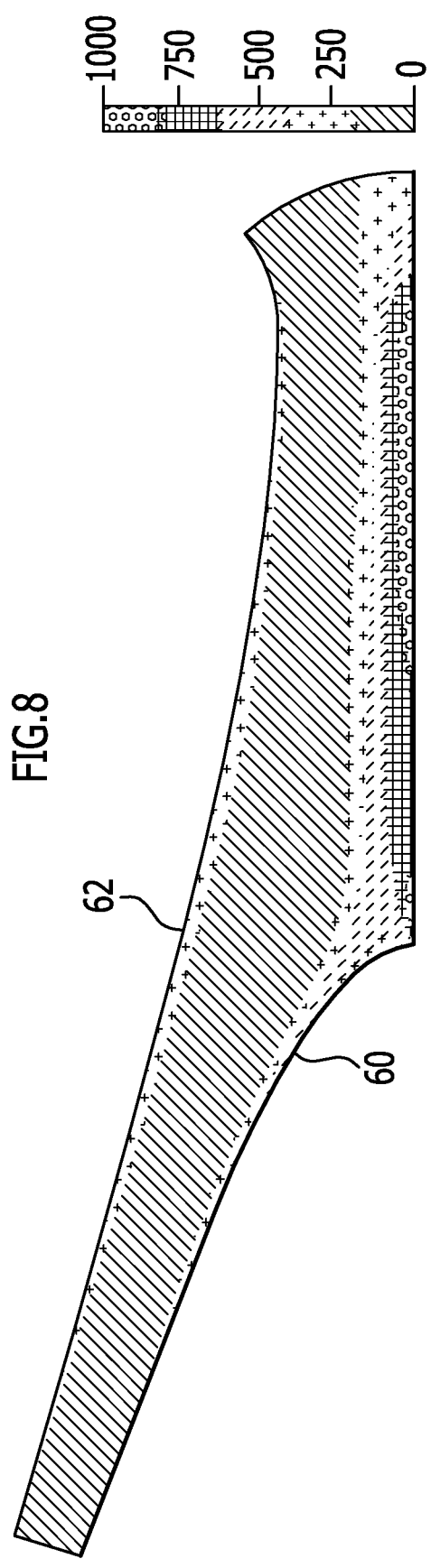
Figure 9:
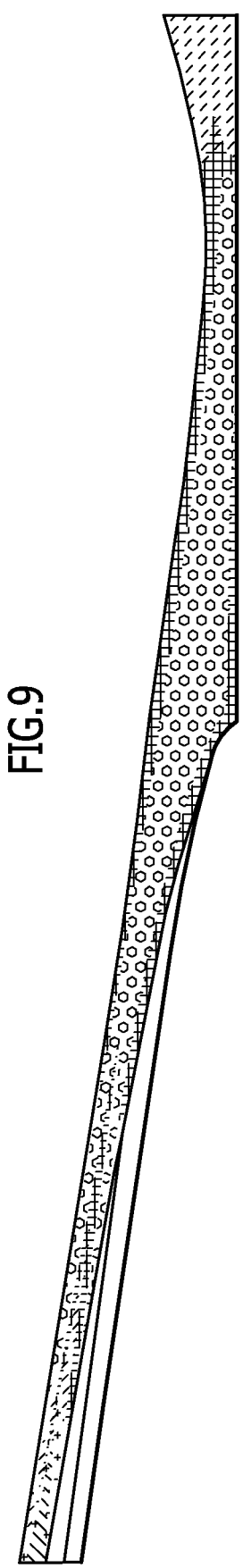
Figure 10:
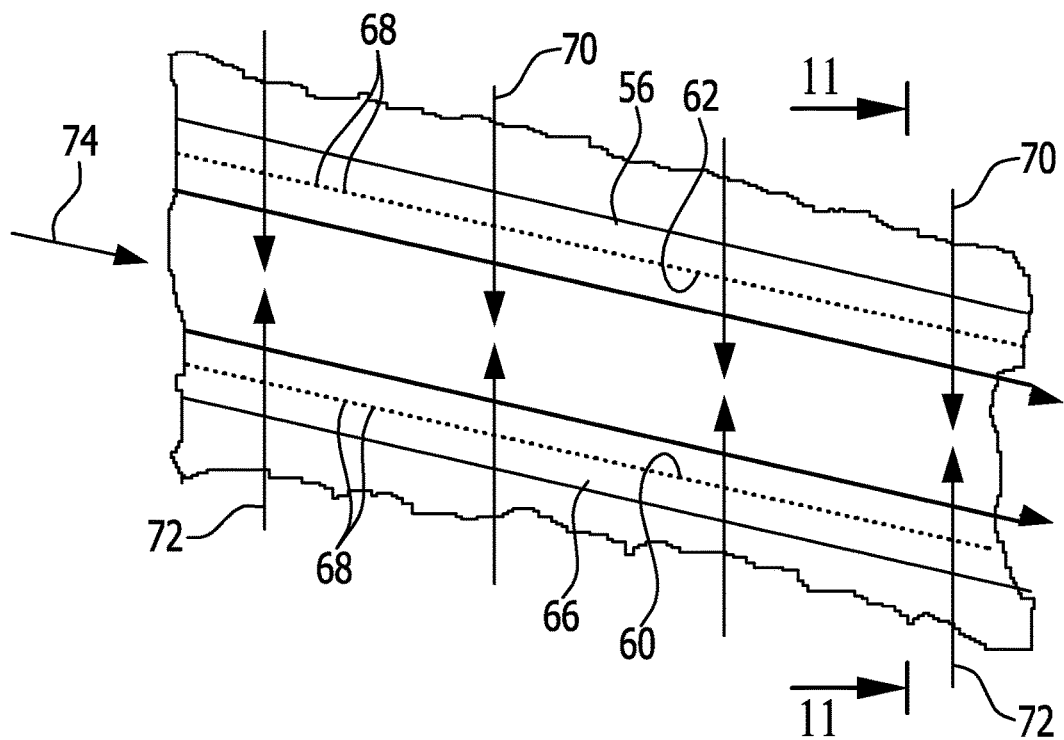
Figure 11:
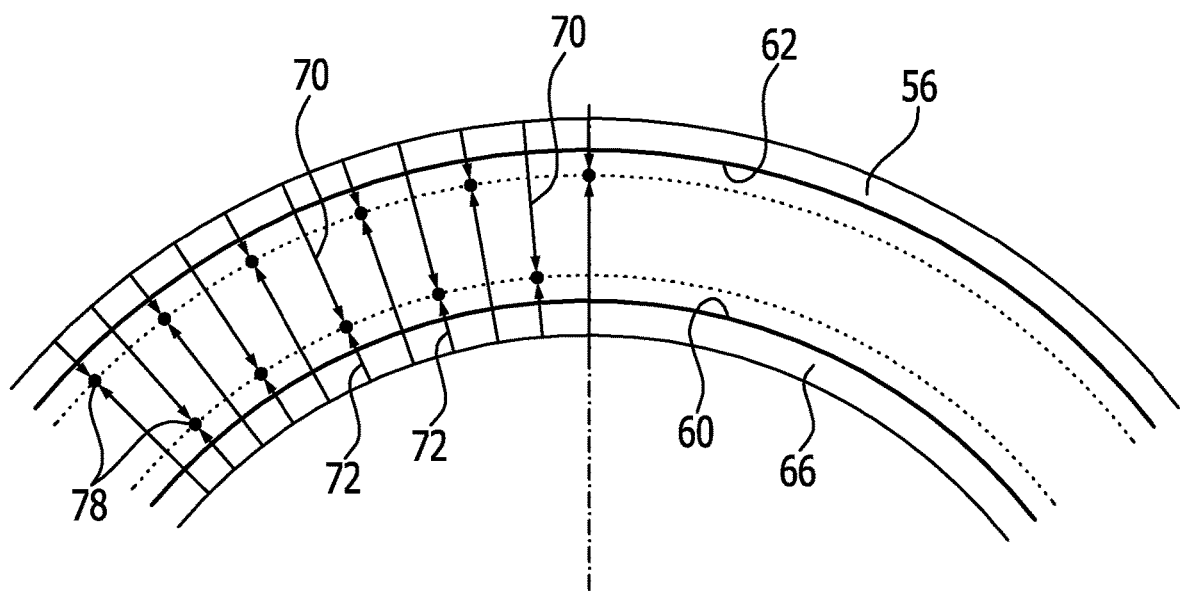
Figure 12:
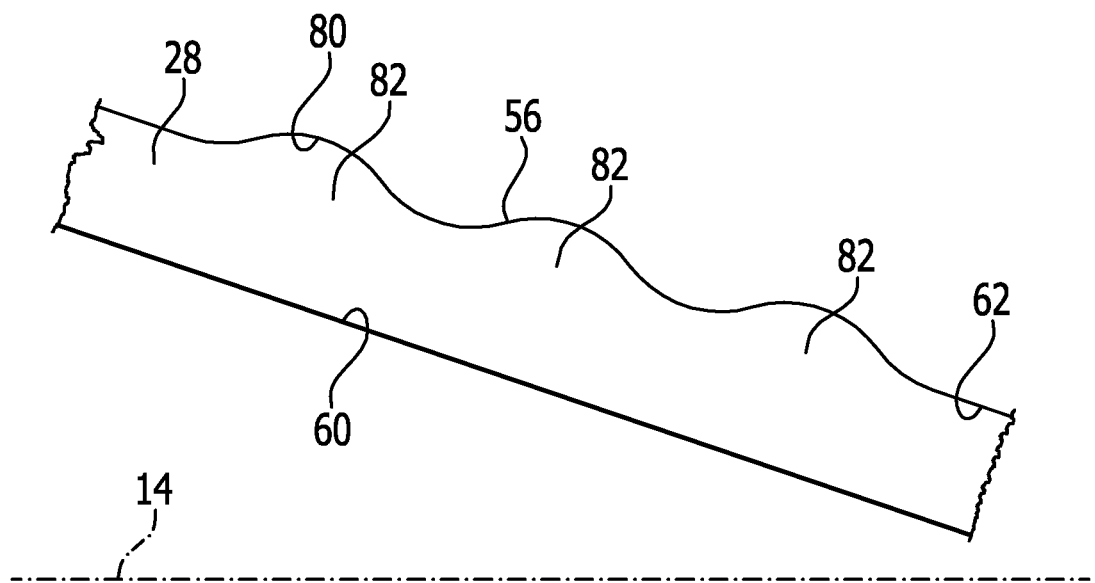
Figure 13:
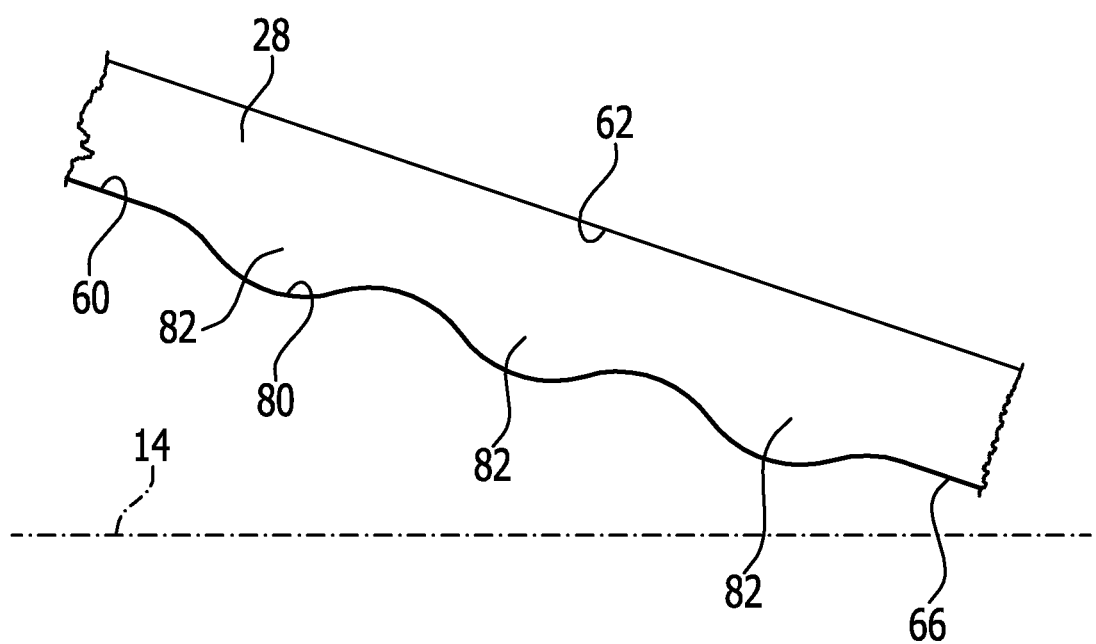

The foregoing summary and the following description may be better understood in conjunction with the drawing figures, of which:

FIG. 1: shows a schematic illustration of a conventional contour of a thrust space design;

FIG. 2: shows a schematic illustration of a thrust chamber contour defined by a single hyperboloid;

FIG. 3: shows a schematic illustration of a thrust space contour with two hyperboloids for defining the inner and outer nozzle walls;

FIG. 4: shows a schematic illustration of a thrust space design according to the invention with inner and outer nozzle wall;

FIG. 5: shows a schematic illustration of part of a thrust chamber device with first propellant component flowing into a thrust space;

FIG. 6: shows a schematic illustration of part of a gas generator engine;

FIG. 7: shows a schematic illustration of part of an engine with pre-combustion chamber for operation in the pre-combustion cycle;

FIG. 8: shows an exemplary illustration of a homogeneous viscosity profile in the vicinity of the wall calculated from a hot-gas simulation;

FIG. 9: shows a schematic illustration of a temperature profile in the thrust space with fully separate injection of the propellant component on the one hand through the injection wall and on the other hand through the inner and outer nozzle wall;

FIG. 10: shows a schematic enlarged illustration of a detail of the annular combustion chamber;

FIG. 11: shows a schematic illustration of part of a sectional view along line 11-11 in FIG. 10 through the annular combustion chamber;

FIG. 12: shows a schematic illustration of a detail of the annular combustion chamber of a further exemplary embodiment of a thrust chamber; and FIG. 13: shows a schematic illustration of a detail of the annular combustion chamber of a further exemplary embodiment of a thrust chamber.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a thrust chamber device comprising a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion, the first portion being delimited by an inner nozzle wall having an inner thrust space surface, which tapers toward the second portion, an annular combustion chamber being formed between the inner thrust space surface and the outer thrust space surface and extending over the first portion, the thrust chamber device also comprising a plurality of first propellant inlets for a first propellant component and a plurality of second propellant inlets for a second propellant component, wherein the outer nozzle wall comprises at least a part of the plurality of first propellant inlets.

The proposed development of a known thrust chamber device has in particular the advantage that the first propellant component guided into the thrust chamber through the plurality of first propellant inlets can pass fully into the thrust space. As the first propellant component flows through the outer nozzle wall, the outer nozzle wall is cooled. There is thus no mass flow loss of the first propellant component. The first propellant inlets are formed in particular in such a way that more propellant may be injected into the thrust space than is necessary for the cooling of the outer nozzle wall. This makes it possible in particular to introduce the total amount of the first propellant component into the thrust space through these first propellant inlets. In particular, it is thus made possible to separate the first and second propellant inlets spatially from one another in such a way that the first propellant inlets are arranged in the outer nozzle wall and the second propellant inlets are arranged in another wall of the thrust chamber delimiting the thrust space. This configuration is then also possible in particular if the thrust chamber device does not have an inner nozzle wall and if the first portion and the second portion form a common portion of the thrust space. By this proposed form of injection of the first propellant component, which for example may be the fuel, in particular liquid hydrogen, liquid methane (CH$_4$) or also liquid natural gas (LNG), on the one hand the outer nozzle wall can be optimally cooled and on the other hand the first propellant component can be injected selectively into any regions of the first and/or second portion of the thrust space, such that optimal mixing between the first and the second propellant component may be achieved in these two portions. The combustion efficiency may thus be increased. In addition, in particular requirements of the material for forming the outer nozzle wall can also be reduced as needed, since, during the entire operation of the thrust chamber device, the outer nozzle wall may be cooled in a manner in which better cooling than that which is actually necessary is made possible. In addition, a risk of damage to the thrust chamber wall can also be minimised, since the thrust chamber wall may be held approximately at the same low temperature practically continuously. The inner or outer nozzle wall may optionally also have further propellant inlets, in particular second propellant inlets, for the second propellant component or propellant inlets for a third or further propellant component.

It is advantageous if the outer nozzle wall is at least partially fluid-permeable in order to form at least a part of the plurality of first propellant inlets. Optionally or alternatively, the first propellant inlets may also be provided in the form of nozzles or channels of the outer nozzle wall.

The thrust chamber device can be formed particularly compactly if the outer nozzle wall is porous in order to form at least part of the plurality of first propellant inlets. A porous outer nozzle wall makes it possible in particular to inject or introduce the first propellant component into the thrust space through pores in the outer nozzle wall. In this regard, in particular materials that have a porosity necessary for this purpose can be used for the outer nozzle wall. This porosity is preferably greater than 8%, in particular much greater. Such a porosity is used in particular to protect the outer nozzle wall against overheating by transpiration cooling.

The porosity of the outer nozzle wall is favourably at least approximately 10% at least in part. It is preferably at least approximately 15% in part. It is more preferably at least approximately 20% at least in part. In particular, the expression "at least in part" means that the porosity in regions in which a cooling of the outer nozzle wall is desired lies in a range sufficient for transpiration cooling, that is to say approximately 8%. However, in order to inject the first propellant component into the thrust space in an amount so that the desired combustion can take place there, the porosity should be preferably in particular greater than at least approximately 10%. The greater the porosity, the greater is the amount of first propellant component that may be introduced into the thrust space. Here, the porosity is set particularly preferably in such a way that there is an optimal relation between mass flow and supply pressure, the optimal supply pressure then being achieved if the pressure drop across the porous nozzle wall is at least of such a magnitude that the nozzle wall is protected against critical pressure surges caused by combustion instabilities. It should also be clarified again that the total amount of first propellant component may be used for combustion purposes, even if the first propellant component has already cooled the outer nozzle wall prior to entry into the thrust space. Regions of the outer nozzle wall which have the stated minimum porosities may extend over all specified portions of the thrust space or over parts thereof, and may be in particular the regions of the outer nozzle wall surrounding the thrust space annularly.

It is advantageous if the porosity of the outer nozzle wall changes as a function of the spacing from a first end of the first portion. This makes it possible in particular to inject selectively a greater amount of the first propellant component into specific regions of the thrust space than into other regions. An excess of the first propellant component in the vicinity of the narrowest point is not absolutely necessary for combustion purposes. By contrast, in particular in the first portion, a sufficient amount for combustion of the first propellant component is desirable in the annular combustion chamber. The porosity of the outer nozzle wall for example may also increase and also decrease again multiple times. Regions of the nozzle wall, for example mixing regions or propellant mixing regions, in which a greater amount or a smaller amount of the first propellant component can be injected into the thrust space can thus be formed.

It is advantageous if the porosity decreases starting from the first end of the first portion toward the narrowest point. In particular, the porosity may decrease continuously. In particular, the porosity may be provided proportionally to the cross-sectional area of the thrust space starting from the first end of the first portion. More of the first propellant component may thus also be introduced into the thrust space in regions of larger cross section.

It is also advantageous if the inner nozzle wall comprises at least a part of the plurality of first propellant inlets. This makes it possible, in a simple way, to also sufficiently cool the inner nozzle wall by the first propellant component with injection thereof into the thrust space. It is additionally possible, through the inner nozzle wall, to likewise inject a part of the first propellant component into the thrust space for combustion purposes. In particular, an improved combustion stability can thus be achieved in the annular space of the first portion of the thrust space. A construction of the conventional injector in the region of an end-side area of the thrust space towards the end of the first portion can thus also be simplified if the first propellant inlets are configured in such a way that they enable the injection of the entire first propellant component through the inner nozzle wall and the outer nozzle wall. It is thus possible to avoid complex coaxial injectors, with which the two propellant components are injected in conventional engines coaxially with one another, that is to say through a nozzle and through a ring nozzle surrounding it concentrically. The inner nozzle wall and the outer nozzle wall can thus be formed as an injector for the total amount of first propellant component to be injected. In the case of efficient combustion, that is to say optimised with maximised specific impulse $I_{SP}$, that is to say with fuel excess, the inner nozzle wall and the outer nozzle wall forming the injector may be configured such that no additional pressure losses are produced as a result of wall cooling. Due to the configuration of the annular combustion chamber in the first portion, an improved combustion stability is also achieved. A combustion chamber core, also referred to as an insert body, forming the inner nozzle wall may additionally damp, or even completely eliminate, specific resonance modes in the thrust space. As also already described above for the outer nozzle wall, the inner nozzle wall may be formed from practically any material, in particular also from a metallic material, since a supercooling so to speak of the inner nozzle wall may be achieved by a sufficiently high amount of the first propellant component injected into the thrust space through the inner nozzle wall to reliably avoid an overheating of the inner nozzle wall. The choice of the material for forming the inner and/or outer nozzle wall is practically completely non-critical, since a significantly improved cooling may be achieved by a full flow of the first propellant component through the nozzle wall. In this context, a "full flow" means that more, that is to say a greater amount, of the first propellant component is guided through the inner and/or outer nozzle wall than is necessary for transpiration cooling of same.

The first propellant component can be injected in a simple way into the thrust space through the inner nozzle wall if the inner nozzle wall is at least partially fluid-permeable so as to form at least a part of the plurality of first propellant inlets. For example, the fluid permeability may be achieved by forming fluid channels for injection of the first propellant component, which fluid channels lead into the thrust space.

The inner nozzle wall is favourably porous so as to form at least a part of the plurality of first propellant inlets. For example, the amount of propellant to be injected can be predefined at least in part by the porosity. Furthermore, materials which are inherently porous can be used to form the inner nozzle wall. For example, ceramics may be one possibility. Woven fibre fabric or fibre-reinforced materials may also be used to form the inner and/or outer nozzle wall.

So as to ensure not only a cooling of the inner nozzle wall, but also a sufficiently large propellant flow into the thrust space, it is favourable if the porosity of the inner nozzle wall is at least approximately 10%. The porosity is preferably at least approximately 15%. It is more preferably at least approximately 20% at least in part. In any case the porosity is selected such that it is greater than necessary for pure transpiration cooling.

The porosity of the inner nozzle wall preferably changes as a function of the spacing from a first end of the first portion. For example, the porosity may then increase and decrease again once or more. Local maxima and minima of the porosity may thus be achieved both in the inner nozzle wall and at the outer nozzle wall.

In accordance with a further preferred embodiment of the invention it may be provided that the porosity decreases starting from the first end of the first portion toward the second portion. In this way it may be achieved that considerably more of the first propellant component may be injected into the thrust space in the vicinity of the first end of the first portion directed away from the second portion than in the region of an end of the inner nozzle wall at the transition between the first and second portion.

It is favourable if all first propellant inlets are arranged or formed in the outer nozzle wall and the inner nozzle wall. This makes it possible in particular to introduce the first propellant component into the thrust space fully through the inner and the outer nozzle wall. As already indicated above, coaxial injectors of complex design, as are used conventionally, may thus be dispensed with entirely. Merely an injector for a second propellant component is required, which preferably may be produced very easily in an ALM (Additive Layer Manufacturing) process. There is then no need for a separation of different injection channels for two or more propellant components in the injector. It is also possible to inject the propellant components into the thrust space with injection directions transverse to one another. This enables an improved mixing of the propellant components in the thrust space. Furthermore, in particular a high combustion efficiency and a good combustion stability may thus also be achieved.

A particularly simple structure of the thrust chamber device may be achieved in particular if the inner nozzle wall and the outer nozzle wall have exclusively first propellant inlets. In this way only this propellant component can be injected into the thrust chamber through the inner nozzle wall and the outer nozzle wall.

It is advantageous if the inner nozzle wall and/or the outer nozzle wall are formed from a ceramic and/or metallic material. In particular ceramic or fibre-ceramic materials can be formed with desired porosities. In particular, injection channels may be introduced in a defined way into metallic nozzle walls. It is optionally also possible to combine metallic materials and ceramic materials when forming the nozzle walls so as to form in particular regions with defined entry channels and regions with defined porosities.

It is favourable if the inner nozzle wall has a plurality of inner coolant inlets and/or if the outer nozzle wall has a plurality of outer coolant inlets for a coolant for cooling the inner nozzle wall and/or the outer nozzle wall. This configuration enables a cooling of the nozzle walls in particular in a simple way, for example by transpiration cooling. Here, the heat necessary for evaporating a liquid coolant is drawn from the inner and/or outer wall as they are passed through by a medium flow, if the thrust chamber is not operated in the supercritical state of the medium.

A particularly simple and compact structure of the thrust chamber device may be achieved in particular in that the plurality of first propellant inlets forms the plurality of inner coolant inlets and/or the plurality of outer coolant inlets. In other words the first propellant inlets, as already set out in further detail above, may be used not only for the injection of the first propellant component, but also for cooling the inner and outer nozzle walls. As mentioned, this may be achieved in particular without excessive loss of enthalpy or pressure losses.

It is favourable if the first portion of the thrust space is delimited on a side directed away from the second portion by an injection wall, which connects the inner nozzle wall and the outer nozzle wall to one another, and if at least a part of the plurality of second propellant inlets is arranged or formed in the injection wall. This configuration makes it possible in particular to inject the second propellant component into the thrust space at least in part, in particular fully, through the injection wall. In particular it is thus possible to introduce the propellant components into the thrust space in injection directions transverse to one another, whereby good mixing and thus also a high combustion stability may also be achieved.

The construction of the thrust chamber device can be further simplified if the plurality of second propellant inlets is arranged or formed exclusively in the injection wall. In particular, the first propellant component can thus be injected into the thrust space exclusively through the inner and the outer nozzle wall, and the second propellant component exclusively through the injection wall.

The thrust chamber device can be formed in a simple way if the injection wall is of annular form so as to close the ring-shaped annular combustion chamber. In particular a ring-shaped opening of the thrust chamber may be closed by the injection wall in this form so as to delimit the thrust space at the first end of the first portion thereof in a simple way.

The injection wall may optionally have further propellant inlets for a third propellant component. It is favourable if the injection wall comprises exclusively second propellant inlets. A system simplification can thus be achieved if only first and second propellant inlets are provided.

In order to achieve a selective injection of the second propellant component into the thrust space, it is favourable if the plurality of second propellant inlets are provided in the form of channels, which have channel mouths directed into the annular combustion chamber. For example, these may be oriented and aligned as described in DE 10 2013 105 342 A1. In particular, the second propellant inlets may be arranged and formed in such a way that the second propellant component forms a spray cone or a hyperboloid into the annular combustion chamber. In the latter case the second propellant inlets may be provided for example in the form of channels which are arranged and/or formed in a manner running skewed in relation to the longitudinal axis of the thrust chamber. The injection jets may also run in particular parallel to the surface tangents in combustion chamber axis sections, that is to say in planes parallel to the combustion chamber axis and therefore not necessarily along the generating straight line of the hyperboloid.

In order to achieve efficient cooling and guidance of the combustion products in the thrust space, it is advantageous if the inner thrust space surface is convexly curved or substantially convexly curved in the direction of the outer thrust space surface. The expression "substantially convexly curved" means in particular that an envelope of the inner thrust space surface is convexly curved. The inner thrust space surface may then also have short regions with concave curvature, for example in order to change a cross-sectional area of the annular combustion chamber, in particular to increase it, so as to form propellant mixing regions.

It is advantageous if the outer thrust space surface is convexly curved or substantially convexly curved pointing in the direction of the inner thrust space surface. Compared to a conventional contour of an outer nozzle wall of a thrust chamber as is shown by way of example in FIG. 1, typical boundary layer turbulences can thus be avoided, these also being referred to as Görtler vortices. Such vortices form in particular in the region of the narrowest point, which is defined by the outer nozzle wall.

In accordance with a further preferred embodiment of the invention it may be provided that the thrust chamber defines a longitudinal axis and that the thrust chamber, in particular the first portion and/or the second portion and/or the third portion, is formed rotationally symmetrically with respect to the longitudinal axis. This simplifies in particular the structure and the construction of the thrust chamber device.

It is also advantageous if the outer thrust space surface and/or the inner thrust space surface are/is formed rotationally symmetrically with respect to the longitudinal axis. This simplifies in particular the construction of the thrust chamber device.

Particularly optimal homogeneous viscosity profiles in the vicinity of the inner and outer nozzle walls may be achieved in particular if the inner thrust space surface and/or the outer thrust space surface have the form of a hyperboloid of revolution at least in part. In particular they may have portions of differently curved hyperboloids of revolution. It is thus also made possible to define a constant cross-section of the annular combustion chamber, in particular in a simple way.

The annular combustion chamber preferably has a constant or substantially constant cross-sectional area. The inner and outer thrust space surfaces may indeed change, however a quasi-cylindrical annular combustion chamber thus can be formed in this way, which then transitions into a convergent thrust chamber portion for the purpose of sound transmission, without any change to the direction of curvature, which is given automatically by the geometric cooperation of purely convex outer thrust space surface and purely convex inner thrust space surface. Due to the tapering outer nozzle wall, the need for coolant, that is to say in particular for the first propellant component, may thus also be reduced with decreasing free cross-sectional area of the thrust space, defined by the outer nozzle wall.

It may also be advantageous if a cross-sectional area of the annular combustion chamber changes as a function of the spacing from a first end of the annular combustion chamber so as to form at least one propellant mixing region in the annular combustion chamber. In particular, two, three, four or more propellant mixing regions of this kind may be formed in the annular combustion chamber. Such a cross-sectional change may be achieved in particular if the inner or outer thrust space surfaces do not curve or are curved concavely opposite a preferred convex curvature over a region extending in the direction of the longitudinal axis.

It is advantageous if the thrust chamber device has a first injection device for injecting the at least one first propellant component into the thrust space in a direction transverse to the inner thrust space surface and/or the outer thrust space surface. In particular, the injection device may be formed to inject the at least one first propellant component into the thrust space perpendicularly to the inner and/or outer thrust space surface. This kind of construction of the first injection device has the advantage in particular that a second propellant component may be injected or sprayed into the thrust space transversely, in particular perpendicularly, to the first propellant component.

In order to be able to spray the first propellant component into the thrust space at sufficiently high pressure, it is favourable if the first injection device comprises a first pump device for pumping the at least one first propellant component from a first propellant store, through the plurality of first propellant inlets, into the thrust space.

It is also favourable if a second injection device is provided for injecting the at least one second propellant component into the first portion in a direction parallel or substantially parallel to tangents to the inner thrust space surface and/or the outer thrust space surface. The propellant components may thus be sprayed into the thrust space in particular transversely, preferably perpendicularly to one another.

The second propellant component can be sprayed into the thrust space in a simple way if the second injection device comprises a second pump device for pumping the at least one second propellant component from a second propellant store, through the plurality of second propellant inlets, into the first portion. Both the first and the second pump device may be provided in particular in the form of turbopumps with a drive turbine and a pump impeller arranged in particular on the same shaft. The turbines of the turbopumps may be driven in particular by combustion gases removed from the thrust space or by reacting a part of the propellant components in a pre-combustion chamber and feeding the combustion gases to the turbine. In this way, a gas generator engine in particular can be formed. If, alternatively, the turbine of a pump device is driven by the exhaust gas from a pre-combustion chamber, into which a propellant component is injected with a large excess, a so-called pre-combustion chamber engine may be formed. The exhaust gas may then be injected, together with the propellant component not reacted during the combustion, into the thrust space through the first or second propellant inlets. For example, a small part of the first propellant component may be combined in the pre-combustion chamber with the second propellant component, wherein only a small part of the first propellant component reacts. With use of turbopumps as pump devices, in particular one turbine may be used in order to drive two pump impellers, by means of which the first propellant component on the one hand and the second propellant component on the other hand may be conveyed. Liquid propellant components, such as liquid oxygen, liquid hydrogen, liquid methane or the like, are preferably used as propellant components.

Further, the invention relates to an engine, in particular for a flying object or an aircraft, comprising a thrust chamber device, which comprises a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion, the first portion being delimited by an inner nozzle wall with an inner thrust space surface, which tapers toward the second portion, an annular combustion chamber being formed between the inner thrust space surface and the outer thrust space surface and extending over the first portion, the thrust chamber device also comprising a plurality of first propellant inlets for a first propellant component and a plurality of second propellant inlets for a second propellant component, wherein the outer nozzle wall comprises at least a part of the plurality of first propellant inlets.

An engine developed in this way then has the advantages already described above in conjunction with preferred embodiments.

The invention also relates to a flying object or an aircraft, comprising a first propellant store for at least one first propellant component, a second propellant store for at least one second propellant component, and an engine comprising a thrust chamber device, which comprises a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion, the first portion being delimited by an inner nozzle wall with an inner thrust space surface, which tapers toward the second portion, an annular combustion chamber being formed between the inner thrust space surface and the outer thrust space surface and extends over the first portion, the thrust chamber device also comprising a plurality of first propellant inlets for a first propellant component and a plurality of second propellant inlets for a second propellant component, wherein the outer nozzle wall comprises at least a part of the plurality of first propellant inlets.

Due to the improved cooling of the nozzle walls of the thrust chamber device and the described lower losses, greater payloads can be moved with the same amount of propellant on account of the higher specific impulse $I_{SP}$.

The invention further relates to a method for operating a thrust chamber device is proposed, which comprises a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface tapers in the first and second portion toward the third portion, widens in the third portion away from the second portion, and has a narrowest point at the transition from the second portion to the third portion, the first portion being delimited by an inner nozzle wall with an inner thrust space surface, which tapers toward the second portion, an annular combustion chamber being formed between the inner thrust space surface and the outer thrust space surface, which extends over the first portion, the thrust chamber device also comprising a plurality of first propellant inlets for a first propellant component and a plurality of second propellant inlets for a second propellant component, the outer nozzle wall comprising at least a part of the plurality of first propellant inlets, wherein a greater amount of the first propellant component than is necessary for cooling the inner nozzle wall and/or the outer nozzle wall is injected into the thrust space through a part of the plurality of first propellant inlets.

As already described above, an overspecified cooling of the nozzle walls may thus be achieved, such that an overheating of the nozzle walls is practically no longer possible. Mass flow and pressure losses can also be reduced, whereby the specific impulse $I_{SP}$ of a thrust chamber device can be improved.

It is favourable if at least an amount of the first propellant component that is more than twice the amount necessary for cooling of the inner nozzle wall and/or the outer nozzle wall is injected through the plurality of first propellant inlets. An amount of the first propellant component more than three times the necessary amount is preferably injected through the plurality of first propellant inlets.

The structure of a thrust chamber device can be simplified in a simple way if the entire first propellant component is injected into the thrust space through the plurality of first propellant inlets. In particular, as described above, a second injection device may thus be formed, which comprises second propellant inlets, which are arranged or formed neither in the inner nozzle wall nor in the outer nozzle wall.

FIG. 1 shows schematically a part of a thrust chamber 10 as is known from the prior art. It comprises a cylindrical first portion 12 extending coaxially with a longitudinal axis 14, an adjacent second portion 16 concavely curved in the direction of the longitudinal axis 14, and an adjacent third portion 18, which is convexly curved in the direction of the longitudinal axis 14.

In the region of the third portion 18, a wall 20 delimiting the thrust chamber 10 defines a narrowest point 22, by means of which combustion gases are accelerated divergently toward the nozzle outlet. The third portion, starting from the point 22, is also referred to as a supersonic region.

Boundary layer turbulences, or what are known as Görtler vortices, which undesirably hinder the cooling of an inner wall surface 26 of the wall 20, may form in particular in the region of the second portion 16. In particular in the case of film cooling with a cooling fluid film on the wall surface 26, flow separations and consequently losses of the coolant and overheating in the region of the second portion 16 and of the point 22 may occur.

FIG. 2 shows schematically an example of a modified thrust chamber 10, the wall 20 of which, delimiting a thrust space 28, has the form of a hyperboloid of revolution. The wall surface 26, with this form of the thrust chamber 10, is curved fully convexly pointing toward the longitudinal axis 14. It thus has no concavely curved portions. The thrust space 28 continuously tapers starting from an entry region 30 to the narrowest point 22.

Due to the continuous curvature of the wall 20, the disadvantages of the conventional profile, specifically boundary layer turbulences in the case of film cooling, can be avoided practically completely.

A third variant of a thrust chamber 10 is shown schematically in FIG. 3. The wall 20 here forms an outer wall 20, which is formed again as a hyperboloid of revolution, in relation to the longitudinal axis 14. The thrust chamber 10 has a first portion 32, a second portion 34, and a third portion 36, which divide the thrust space 28 into corresponding portions 32, 34 and 36.

The first portion 32 is defined by an insert body 38, which is inserted into the thrust space 28 and which defines an inner wall 40 with a wall surface 42 of the thrust space 28, which has the form of a two-shell hyperboloid of revolution. A tangent 44 to the insert body 38 at the transition between the first portion 32 and the second portion 34 runs perpendicularly to the longitudinal axis 14.

The first portion 32 defines an annular combustion chamber 46 as part of the thrust space 28. The wall surfaces 26 and 42 may be selected in particular so that a free cross-sectional area 48 is constant as a function of the spacing 50 from a first end 52 of the first portion 32. Proceeding from the first end 52, the outer diameter of the annular area defined by the annular combustion chamber 46 decreases, as does the diameter of an inner delimitation of this annular area. At the transition 54 between the first portion 32 and the second portion 34, the annular area then transitions preferably without curvature into a circular area, the cross section of which tapers further toward the narrowest point.

A quasi-cylindrical annular combustion chamber 46 is created by the constant cross-section of the annular combustion chamber 46 as described in the case of the thrust chamber 10 shown in FIG. 3, but with the advantage that the wall surface 26 tapers continuously starting from the first end 52, and therefore no flow separations or vortices of a cooling fluid film occur during a cooling process.

The configuration of the thrust chamber 10 shown schematically in FIG. 3 is shown in FIG. 4, again schematically, with slightly differently shaped contours. An outer nozzle wall 56 is continuously curved convexly facing in the direction of the longitudinal axis 14. The insert body 38 is provided in the form of a two-shell hyperboloid and with its end 58 defines the transition 54 between the first portion 32 and the second portion 34. The wall surface 42 delimiting the thrust space 28 defines an inner thrust space surface 60. The wall surface 26 delimiting the thrust space 28 defines an outer thrust space surface 62.

In the region of the first portion 32, the inner thrust space surface 60 and the outer thrust space surface 62 delimit the annular combustion chamber 46. The cross-sectional area 48 may be constant or may increase or decrease in the direction of the transition 44 as a function of the shape of the thrust space surfaces 60 and 62.

The second portion 34 extends from the transition 54 to the narrowest point 22. Here, the thrust space 28 is delimited exclusively by the outer thrust space surface 62.

The thrust space 28 widens again, starting from the narrowest point 22 at the transition 64 from the first portion 34 to the second portion 36.

The first portion 32 may thus form in particular a quasi-cylindrical region. The second portion 34 forms a convergent region of the thrust space 28, and the third portion 36 forms a diverging region, also referred to as a supersonic region.

FIG. 5 shows further features of the thrust chamber 10.

Both the outer nozzle wall 56 and an inner nozzle wall 66, which defines the inner thrust space surface 60, are provided with a plurality of first propellant inlets 68. As a result of this, a first propellant component may be sprayed or injected into the thrust space 28 through the outer nozzle wall 56 in the direction of the arrows 70. This first propellant component may also be sprayed into the thrust space 28 through the propellant inlets 68 in the inner nozzle wall 66 in the direction of the arrows 72.

The first propellant component, as shown by the arrows 70 and 72, is preferably sprayed transversely, in particular perpendicularly, to the longitudinal axis 14.

A second propellant component, as symbolised by the arrow 74, may be sprayed into the ring-shaped annular combustion chamber 46 from the first end 52, with the spraying direction, symbolised by the arrow 74, possibly running substantially parallel to the inner and/or outer thrust space surface 60, 62.

The amount of the first propellant component that is injected through the first propellant inlets 68 into the thrust space 28 is greater, preferably much greater, than is necessary for transpiration cooling of the outer nozzle wall 56 and the inner nozzle wall 66.

In particular, the first propellant component may be injected into the thrust space 28 fully through the outer nozzle wall 56 and the inner nozzle wall 66.

The inner nozzle wall 66 and the outer nozzle wall 56, in order to form the first propellant inlets 68, may have in particular injection channels which lead into the thrust space 28 in a manner oriented transversely, in particular perpendicularly or skewed to the longitudinal axis 14.

Alternatively, the first propellant inlets 68 may also be formed by pores of the outer nozzle wall 56 and inner nozzle wall 66 formed from a porous material.

The inner nozzle wall 66 and the outer nozzle wall 56 may be formed in particular from a ceramic material and from a metallic material. They may also be formed optionally from a combination of ceramic and/or metallic materials.

Due to the inflow of the cold liquid first propellant component through the first propellant inlets 68, which thus at the same time form a plurality of cooling inlets 78, a supercooling so to speak of the inner and outer nozzle walls 56 and 66 is achieved. This enables in particular a practically free choice of the material from which the inner and outer nozzle wall 56, 66 are formed, since an overheating thereof during operation is practically impossible.

Due to the narrow annular combustion chamber 46, a good mixing and stable combustion of the propellant components reacting with one another may be achieved in the thrust space 28.

The porosity in the case of porous nozzle walls 56 and 66 lies preferably in a range of from approximately 10% to approximately 30%, in particular in a range of from approximately 15% to approximately 25%. In particular, the porosity may be approximately 22%. In the case of pure transpiration cooling, a porosity of approximately 8% is necessary in order to reliably achieve the necessary cooling. As a result of the greater porosity it may be ensured that a sufficient amount of the first propellant component which is injected into the thrust space 28 through the first propellant inlets 68 is available for the combustion.

The first propellant component may be in particular liquid hydrogen, liquid methane, or liquid natural gas.

FIG. 10 shows an enlarged view of the detail A from FIG. 5. The porous nozzle walls 56 and 66 are shown by the dashed line and define the inner and outer thrust space surfaces 66 and 62.

FIG. 11 shows a sectional view of the detail from FIG. 10. The second propellant component, which is sprayed in the direction of the arrow 74, then meets the first propellant component sprayed in transversely, for example at the points 78. There is thus a directed combustion of the first propellant component with the second propellant component in the annular combustion chamber 46.

The second propellant component may be liquid oxygen, in particular.

FIG. 12 shows by way of example a further detail of the first portion 32 of the thrust space 28. Here, the outer nozzle wall 56 is formed by way of example with three bulges 80, which form mixing regions 82, in which the cross-sectional area of the annular combustion chamber 46 is somewhat enlarged. In particular, the mixing of the propellant components may be optimised in these mixing regions 82.

An alternative to the embodiment or variant shown in FIG. 12 is shown schematically in FIG. 13. Here, mixing regions 82 are formed by bulges 80 of the inner nozzle wall 66. A cross-sectional widening in the annular combustion chamber 56 can thus be achieved also over a length parallel to the longitudinal axis 14.

Bulges 80 may also be provided optionally on the outer nozzle wall 56 and the inner nozzle wall 66 in order to form mixing regions 82.

FIG. 6 schematically shows an engine 84 with a thrust chamber device 86 comprising a thrust chamber 10, again shown schematically. The thrust space 28 corresponds in respect of its form to the thrust space 28 shown in FIG. 4.

The engine 84 may be used to drive a flying object 88 or aircraft.

The flying object 88 comprises a first propellant store 90 for a liquid first propellant component, and a second propellant store 92 for a second liquid propellant component. The first propellant component is preferably the fuel, the second propellant component the oxidiser.

The first propellant component is guided by means of a propellant conduit 94 from the first propellant store 90 to a pump impeller 96 of a pump device 98. This comprises a turbine 100, on the shaft 102 of which there are arranged the first pump impeller 96 and a second pump impeller 104.

The second propellant component is fed to the second pump impeller by means of a second propellant conduit 106.

The first propellant component is conveyed from the pump impeller 96 to a pre-combustion chamber 110 by means of a third propellant conduit 108.

The second propellant component is conveyed from the second pump impeller 104 to the pre-combustion chamber 110 by means of a third propellant conduit 112. There, a part of the first and second propellant components is burned. The turbine 100 is driven by means of the combustion gases which are guided by means of a feed conduit 114 to the turbine 110 of the pump device. The combustion exhaust gases 116 are discharged from the pre-combustion chamber 110 and are not used further.

The first propellant component is guided by means of fifth propellant conduits 118 from the first pump impeller 96 to a distributor 120 on the outer nozzle wall 56 and to a distributor 122 on the inner nozzle wall 66. The first propellant component may then flow from the distributors 120 and 122 to the first propellant inlets 68 (not shown in FIG. 6) and through them into the thrust space 28.

The second pump impeller 104 conveys a part of the second propellant component through a sixth propellant conduit 124 to an injection device 126, which comprises an injection wall closing the first end 52 of the thrust space 28 and having at least one second propellant outlet 128 or a plurality of second propellant outlets 128, through which the second propellant component is sprayed into the annular combustion chamber 46 through the first end 52.

FIG. 6 thus shows schematically the structure of a gas generator engine.

FIG. 7 shows schematically an alternative embodiment of a thrust chamber device 86 which conforms substantially in respect of its structure to the thrust chamber device 86 from FIG. 6.

The thrust chamber device in FIG. 7, however, is operated in the pre-combustion cycle. This means that a mixture of the two propellant components in which the second propellant component is predominant is fed to the pre-combustion chamber 110.

An exhaust gas conduit from the turbine 100 with the combustion exhaust gas from the pre-combustion chamber 110 and the as yet unreacted oxidiser as second propellant component is fed to the injection device 126 by the exhaust gas conduit 130.

An engine 84 comprising the thrust chamber device 86 shown in FIG. 7 may be operated, as described, in a pre-combustion cycle, so that in this case no losses of combustion gases may occur, and instead the combustion gases of the pre-combustion chamber, which are used to drive the turbine 100, also pass into the thrust space 28 in order to generate a thrust of the engine 84.

FIG. 8 shows a flow distribution in a thrust chamber 10, as has been described above. Along the inner and outer thrust space surfaces 60 and 62, a homogeneous viscosity profile in the vicinity of the wall is given from a hot-gas simulation. Reynolds numbers in the range of from 0 to 1000 are specified on the scale to the right of the shown viscosity profile and correspond to the brightnesses in the viscosity profile.

Lastly, FIG. 9 shows a simulation example for efficient combustion, which is achieved if the first propellant component and the second propellant component are injected completely separately from one another into the thrust space 28. The fuel as first propellant component is sprayed into the thrust space 28 exclusively through the first propellant inlets 68 in the outer nozzle wall 56 and the inner nozzle wall 66. The second propellant component is injected exclusively through the injection wall of the injection device 126, which closes the first end 52 of the thrust space 28.

An improved cooling of the inner and outer nozzle walls 56 and 66 may be achieved by the full or supersaturated flow of the first propellant component through said inner and outer nozzle walls, more specifically without any mass flow losses of the first propellant component. Pressure losses, if these occur at all, are also significantly reduced. In this way, an overheating of the inner and outer nozzle wall 56, 66 may be avoided.

Combustion is improved if an insert body 38 is provided. In addition, the system of the thrust chamber device 86 is simplified as a whole, since the structure of the injection device 126 is simplified. This injection device is used in particular exclusively for injection of the second propellant component.

The proposed development of known thrust chamber devices enables in particular also the efficient use of methane in liquid form, in particular also directly as natural gas as fuel or first propellant component.

LIST OF REFERENCE NUMERALS 10 thrust chamber
12 first portion 14 longitudinal axis
16 second portion
18 third portion
20 wall
22 narrowest point
24 nozzle outlet
26 wall surface
28 thrust space
30 entry region
32 first portion
34 second portion
36 third portion
38 insert body
40 wall
42 wall surface
44 tangent
46 annular combustion chamber
48 cross-sectional area
50 spacing
52 first end
54 transition
56 outer nozzle wall
58 end
60 inner thrust space surface
62 outer thrust space surface
64 transition
66 inner nozzle wall
68 first propellant inlet
70 arrows
72 arrows
74 arrows
76 coolant inlet
78 point
80 bulges
82 mixing region
84 engine
86 thrust chamber device
88 flying object
90 first propellant store
92 second propellant store
94 propellant conduit
96 first pump impeller
98 pump device
100 turbine
102 shaft
104 second pump impeller
106 second propellant conduit
108 third propellant conduit
110 pre-combustion chamber
112 fourth propellant conduit
114 feed conduit
116 waste gas
118 fifth propellant conduit
120 distributor
122 distributor
124 sixth propellant conduit
126 injection device
128 second propellant outlet
130 waste gas conduit

What is claimed is:

1. A thrust chamber device, comprising:
a thrust chamber with a thrust space having a first portion, a second portion adjacent thereto, and a third portion adjacent to the second portion,
the thrust space being delimited in all three portions by an outer nozzle wall having an outer thrust space surface, which outer thrust space surface continuously tapers, over an entire extent of the first and second portions, toward the third portion, widens in the third portion away from the second portion, and has a narrowest point at the transition from the second portion to the third portion,
the first portion being delimited by an inner nozzle wall with an inner thrust space surface, which continuously tapers, over an entire extent of the first portion, toward the second portion, an annular combustion chamber being formed between the inner thrust space surface and the outer thrust space surface and extending over the first portion,
the first portion being further delimited on a side facing away from the second portion by an injection wall, which connects the inner nozzle wall and the outer nozzle wall to one another, and
a plurality of first propellant inlets for a first propellant component and a plurality of second propellant inlets for a second propellant component,
wherein:
the outer nozzle wall comprises at least a part of the plurality of first propellant inlets,
the plurality of second propellant inlets are arranged or formed only in the injection wall,
the inner nozzle wall and the outer nozzle wall have only first propellant inlets, and
the outer thrust space surface is continuously convexly curved or substantially convexly curved in a direction of the inner thrust space surface over an entire extent of the outer thrust space surface.

2. A thrust chamber device in accordance with claim 1, wherein the outer nozzle wall is at least partially fluid-permeable so as to form at least a part of the plurality of first propellant inlets.

3. A thrust chamber device in accordance with claim 1, wherein the outer nozzle wall is porous so as to form at least a part of the plurality of first propellant inlets.

4. A thrust chamber device in accordance with claim 3, wherein at least one of:
a) a porosity of the outer nozzle wall is at least 10% at least in part, or
a porosity of the outer nozzle wall is at least 15% at least in part, or
a porosity of the outer nozzle wall is at least 20% at least in part, and,
b) a porosity of the outer nozzle wall changes as a function of the spacing from a first end of the first portion,
or
a porosity of the outer nozzle wall changes as a function of the spacing from a first end of the first portion, wherein the porosity decreases starting from the first end of the first portion toward the narrowest point.

5. A thrust chamber device in accordance claim 1, wherein the inner nozzle wall comprises at least a part of the plurality of first propellant inlets.

6. A thrust chamber device in accordance with claim 1, wherein the inner nozzle wall is at least partially fluid-permeable so as to form at least a part of the plurality of first propellant inlets.

7. A thrust chamber device in accordance with claim 6, wherein the inner nozzle wall is porous so as to form at least a part of the plurality of first propellant inlets.

8. A thrust chamber device in accordance with claim 7, wherein at least one of:
a) a porosity of the inner nozzle wall is at least 10%, or
a porosity of the inner nozzle wall is at least 15%, or a porosity of the inner nozzle wall is at least 20%, and b) a porosity of the inner nozzle wall changes as a function of the spacing from a first end of the first portion, or a porosity of the inner nozzle wall changes as a function of the spacing from a first end of the first portion, wherein the porosity decreases starting from the first end of the first portion toward the second portion.

9. A thrust chamber device in accordance with claim 1, wherein at least one of:

a) all first propellant inlets are arranged or formed in the outer nozzle wall and the inner nozzle wall, and b) the inner nozzle wall and/or the outer nozzle wall are/is formed from a ceramic and/or metallic material.

10. A thrust chamber device in accordance with claim 1, wherein at least one of:

a) the inner nozzle wall has a plurality of inner coolant inlets, and/or the outer nozzle wall has a plurality of outer coolant inlets for a coolant for cooling the inner nozzle wall and/or the outer nozzle wall, and b) the inner nozzle wall has a plurality of inner coolant inlets, and/or the outer nozzle wall has a plurality of outer coolant inlets for a coolant for cooling the inner nozzle wall and/or the outer nozzle wall, wherein the plurality of first propellant inlets forms the plurality of inner coolant inlets and/or the plurality of outer coolant inlets.

11. A thrust chamber device in accordance with claim 1, wherein at least one of:

a) the injection wall is ring-shaped in order to close the ring-shaped annular combustion chamber, and b) the injection wall comprises only second propellant inlets, and c) the plurality of second propellant inlets are provided in the form of channels, which have channel mouths directed into the annular combustion chamber.

12. A thrust chamber device in accordance with claim 1, wherein the inner thrust space surface is continuously convexly curved or substantially convexly curved in the direction of the outer thrust space surface.

13. A thrust chamber device in accordance with claim 1, wherein at least one of:

a) the thrust chamber defines a longitudinal axis, and wherein the thrust chamber is rotationally symmetrical with respect to the longitudinal axis, and b) the thrust chamber defines a longitudinal axis, and wherein the thrust chamber, the first portion and/or the second portion and/or the third portion, are rotationally symmetrical with respect to the longitudinal axis, and c) the thrust chamber defines a longitudinal axis, and wherein the thrust chamber is rotationally symmetrical with respect to the longitudinal axis, wherein the outer thrust space surface and/or the inner thrust space surface are rotationally symmetrical with respect to the longitudinal axis, and d) the thrust chamber defines a longitudinal axis, and wherein the thrust chamber, the first portion and/or the second portion and/or the third portion are rotationally symmetrical with respect to the longitudinal axis, wherein the outer thrust space surface and/or the inner thrust space surface are rotationally symmetrical with respect to the longitudinal axis.

14. A thrust chamber device in accordance with claim 1, wherein the outer thrust space surface has the form of a hyperboloid of revolution at least in part.

15. A thrust chamber device in accordance with claim 1, further comprising at least one of:

a) a first injection device for injecting the at least one first propellant component into the thrust space in a direction transverse to the inner thrust space surface and/or the outer thrust space surface, or a first injection device for injecting the at least one first propellant component into the thrust space in a direction transverse to the inner thrust space surface and/or the outer thrust space surface, wherein the first injection device comprises a first pump device for pumping the at least one first propellant component from a first propellant store, through the plurality of first propellant inlets, into the thrust space, and b) a second injection device for injecting the at least one second propellant into the first portion in a direction parallel to tangents to the inner thrust space surface and/or the outer thrust space surface, or a second injection device for injecting the at least one second propellant into the first portion in a direction parallel to tangents to the inner thrust space surface and/or the outer thrust space surface, wherein the second injection device comprises a second pump device for pumping the at least one second propellant component from a second propellant store, through the plurality of second propellant inlets, into the first portion.

16. A thrust chamber device in accordance with claim 1, wherein at least one of:

a) the inner thrust space surface has the form of a hyperboloid of revolution at least in part, and b) the annular combustion chamber has a constant or substantially constant cross-sectional area, and c) the cross-sectional area of the annular combustion chamber changes as a function of a spacing from a first end of the annular combustion chamber so as to form at least one propellant mixing region in the annular combustion chamber.

17. An engine for a flying object or an aircraft, comprising:

a thrust chamber device, which comprises:

a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface continuously tapers, over an entire extent of the first and second portions, toward the third portion, widens in the third portion away from the second portion, and has a narrowest point at the transition from the second portion to the third portion, the first portion being delimited by an inner nozzle wall with an inner thrust space surface, which continuously tapers, over an entire extent of the first portion, toward the second portion, an annular combustion chamber being formed between the inner thrust space surface and the outer thrust space surface and extending over the first portion, the first portion being further delimited on a side facing away from the second portion by an injection wall, which connects the inner nozzle wall and the outer nozzle wall to one another, a plurality of first propellant inlets for a first propellant component and a plurality of second propellant inlets for a second propellant component, wherein:

the outer nozzle wall comprises at least a part of the plurality of first propellant inlets, the plurality of second propellant inlets are arranged or formed only in the injection wall, the inner nozzle wall and the outer nozzle wall have only first propellant inlets, and the outer thrust space surface is continuously convexly curved or substantially convexly curved in a direction of the inner thrust space surface over an entire extent of the outer thrust space surface.

18. A flying object or aircraft, comprising:

a first propellant store for at least one first propellant component, a second propellant store for at least one second propellant component, and an engine comprising a thrust chamber device, the thrust chamber device comprising:

a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface continuously tapers, over an entire extent of the first and second portions, toward the third portion, widens in the third portion away from the second portion, and has a narrowest point at the transition from the second portion to the third portion, the first portion being delimited by an inner nozzle wall with an inner thrust space surface, which continuously tapers, over an entire extent of the first portion, toward the second portion, an annular combustion chamber being formed between the inner thrust space surface and the outer thrust space surface and extending over the first portion, the first portion being further delimited on a side facing away from the second portion by an injection wall, which connects the inner nozzle wall and the outer nozzle wall to one another, and a plurality of first propellant inlets for a first propellant component and a plurality of second propellant inlets for a second propellant component, wherein:

the outer nozzle wall comprises at least a part of the plurality of first propellant inlets, the plurality of second propellant inlets are arranged or formed only in the injection wall, the inner nozzle wall and the outer nozzle wall have only first propellant inlets, and the outer thrust space surface is continuously convexly curved or substantially convexly curved in a direction of the inner thrust space surface over an entire extent of the outer thrust space surface.

19. A method for operating a thrust chamber device which comprises a thrust chamber with a thrust space having a first portion, a second portion adjacent thereto, and a third portion adjacent to the second portion, the thrust space being delimited in all three portions by an outer nozzle wall having an outer thrust space surface, which outer thrust space surface continuously tapers, over an entire extent of the first and second portions, toward the third portion, widens in the third portion away from the second portion, and has a narrowest point at the transition from the second portion to the third portion, the first portion being delimited by an inner nozzle wall with an inner thrust space surface, which continuously tapers, over an entire extent of the first portion, toward the second portion, an annular combustion chamber being formed between the inner thrust space surface and the outer thrust space surface and extending over the first portion, the first portion being further delimited on a side facing away from the second portion by an injection wall, which connects the inner nozzle wall and the outer nozzle wall to one another, and a plurality of first propellant inlets for a first propellant component and a plurality of second propellant inlets for a second propellant component, wherein the outer nozzle wall comprises at least a part of the plurality of first propellant inlets and the plurality of second propellant inlets are arranged or formed only in the injection wall, wherein:

the inner nozzle wall and the outer nozzle wall have only first propellant inlets, and the outer thrust space surface is continuously convexly curved or substantially convexly curved in a direction of the inner thrust space surface over an entire extent of the outer thrust space surface, the method comprising injecting a greater amount of the first propellant component than is necessary for cooling the inner nozzle wall and/or the outer nozzle wall into the thrust space through a part of the plurality of first propellant inlets.

20. A method in accordance with claim 19, wherein at least one of:

a) at least an amount of the first propellant component more than twice the amount necessary for cooling of the inner nozzle wall and/or the outer nozzle wall is injected through the plurality of first propellant inlets, and b) the entire first propellant component is injected into the thrust space through the plurality of first propellant inlets.

* * * * *